United States Patent [19]

Berzen et al.

[11] 4,345,656
[45] Aug. 24, 1982

[54] STRIKING CAP LINING

[75] Inventors: Josef Berzen, Oberhausen; Herbert Mrozik, Bottrop, both of Fed. Rep. of Germany

[73] Assignee: Ruhrchemie AG, Oberhausen, Fed. Rep. of Germany

[21] Appl. No.: 104,992

[22] Filed: Dec. 18, 1979

Related U.S. Application Data

[62] Division of Ser. No. 918,188, Jun. 19, 1978.

[30] Foreign Application Priority Data

Jun. 23, 1977 [DE] Fed. Rep. of Germany ....... 2728164

[51] Int. Cl.³ .................. B25D 17/11; F16F 15/04
[52] U.S. Cl. .................................................. 173/131
[58] Field of Search .......... 173/131; 260/37 M, 42.22, 260/42.46

[56] References Cited

U.S. PATENT DOCUMENTS

| | | | |
|---|---|---|---|
| 1,943,420 | 1/1934 | Budd | 173/131 |
| 2,718,506 | 9/1955 | Elleman | 260/37 M |
| 2,748,099 | 5/1956 | Bruner et al. | 260/37 M |
| 2,931,186 | 4/1960 | Frederick | 173/131 |
| 3,300,329 | 1/1967 | Orsino et al. | 260/42.22 |
| 3,425,981 | 2/1969 | Puletti et al. | 260/42.46 |
| 3,491,055 | 1/1970 | Saunders et al. | 260/42.22 |
| 3,867,315 | 2/1975 | Tigner et al. | 260/37 M |
| 4,036,310 | 7/1977 | Schnell | 173/131 |
| 4,116,710 | 9/1978 | Heikel | 260/37 M |

FOREIGN PATENT DOCUMENTS

| | | | |
|---|---|---|---|
| 1028161 | 3/1978 | Canada | 173/131 |
| 197804 | 8/1976 | France | 173/131 |

Primary Examiner—Werner H. Schroeder
Assistant Examiner—Andrew M. Falik
Attorney, Agent, or Firm—Sprung, Horn, Kramer & Woods

[57] ABSTRACT

There is disclosed a pile-driver comprising a cylinder and a piston, the piston being in registry with a cap disposed over an article to be driven. The cap has a lining in striking relationship with the piston, which lining comprises a thermoplastic and a metal powder.

5 Claims, 1 Drawing Figure

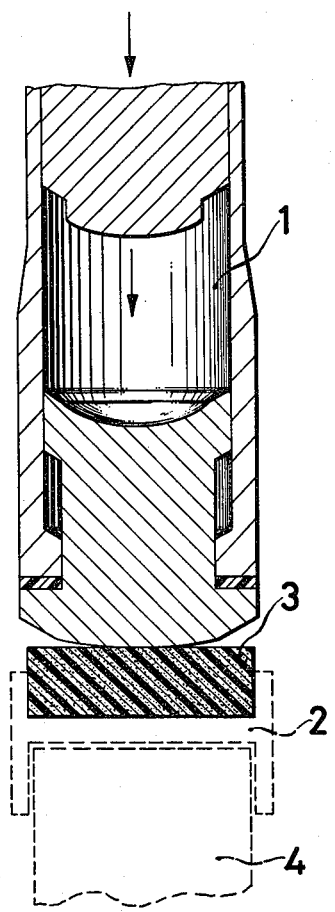

STRIKING CAP LINING

This is a division of application Ser. No. 918,188, filed June 19, 1978.

BACKGROUND OF THE INVENTION

1. Field of the Invention

The present invention refers to a new lining for driving or striking caps. These caps are used in conjunction with pile-drivers, which are operated by a gaseous medium under pressure.

2. Discussion of the Prior Art

Pile-drivers employed for driving in objects, e.g., stakes, consist of a cylinder, a piston situated inside the cylinder and a ram block, which can be moved backwards and forwards by the piston, and is thereby driven against a driving or striking cap. This cap transfers the powerful impact to the object which is to be driven in, e.g., a stake or a girder. A control valve, situated on or near the cylinder, regulates the flow of the pressure medium to the cylinder in order that the piston and the ram block can be moved up and down. A control column, connected to the ram block, moves up and down in conjunction with it thereby effecting the required movements of the control valve. The impact of the driving or striking cap, which transfer the energy of the ram block to the object which is to be driven in, gives rise to serious noise disturbance and, in addition, this impact can have a destructive effect on the pile-driver itself as well as on the object to be driven in.

It is therefore customary to provide the driving or striking caps, which lie between the ram block and the object to be driven in, with an impact transmitting lining. Possible materials for this purpose are, e.g., hard wood, asbestos, polyamide or fiber-reinforced phenol-melamine resin moulding compounds. The known driving or striking cap linings do not meet all the demands made of them. This is especially true with regard to their abrasion resistance, impact strength and, in many cases, their ease of handling. Due to the high energy transfer, the hard wood linings often become sintered to the cap and have to be chiselled out. Asbestos and fibers reinforced with phenolic resins have only a minor impact strength.

SUMMARY OF THE INVENTION

Broadly, this invention contemplates a lining for a driving or striking cap such as employed in connection with a pile-driver which lining comprises a thermoplastic and 5 to 40 volume percent of a metal powder.

It was therefore found that thermoplastics with a 5 to 40 volume percent metal powder content are especially suitable as linings for driving or striking caps and do not exhibit the disadvantages of the known linings.

The term "thermoplastics" refers to high molecular weight polymeric plastics which become soft and are capable of being molded at elevated temperatures but regain their previous solid composition on cooling. Within the framework of the invention, polyamides and high molecular weight polyethylene, in particular polyethylene with a viscosimetrically determined molecular weight of over 500,000, preferably $1 \cdot 10^6$ to $10 \cdot 10^6$ have been found to be especially suitable. Generally speaking, the polyamides have a viscosimetrically determined molecular weight of at least $4 \cdot 10^4$, preferably $4 \cdot 10^4$ to $1 \cdot 10^5$. Other useful thermoplastics include polycarbonates, polypropylene, polyoxymethylene. These generally have a viscosimetrically determined molecular weight of at least $1 \cdot 10^4$, preferably $2 \cdot 10^4$ to $1 \cdot 10^5$.

The driving cap linings, according to the invention, exhibit high abrasion resistance, impact strength and hardness. The metal powder content ensures that the material possesses a high thermal conductivity. The heat resulting from the impact of the ram block on the driving or striking cap is therefore rapidly dissipated, avoiding thermal damage to the thermoplastics employed. Besides the use of thermoplastic high molecular weight polymers, the metal content of the material is decisive in imparting excellent qualities to the new driving or striking cap lining.

The relative position of the metal particles to one another is important for the physical behaviour of the thermoplastics (filled with the metal powder). With regard to the structure of the material, it is significant if the metal particles embedded in the plastic come into contact with one another. Material in which the metal particles are in contact with each other has a higher thermal conductivity, for example, than material in which this is not the case. The properties of the driving or striking cap lining derive, therefore, from the volume of the metal powder and not from a weight relationship.

The type of metal contained in the thermoplastics is not soley decisive for the properties of the new driving or striking cap lining. Pure metals such as copper, iron and aluminum or alloys in powdered form can be used. The use of aluminum is especially suitable, as it has a low density and can therefore be added to the polyethylene in smaller weight proportions than the powdered metals of higher density. The size of the metal particles should not exceed $300\mu$. Particles possessing an average size less than $100\mu$ are particularly suitable.

BRIEF DESCRIPTION OF DRAWING

The enclosed drawing is a side sectional view of a typical cylinder-piston assembly of a pile-driver. Which assembly is equipped with a driving or striking cap of the invention.

DESCRIPTION OF SPECIFIC EMBODIMENT

A striking cap with an inseted lining is illustrated in the attached drawing. 1 is a ram block, 2 is a striking cap, 3 a lining inserted in the striking cap and 4 is the material to be driven in.

The usual thickness of the driving or striking cap lining is 25 to 200 mm. Driving or striking cap linings are usually round, rectangular or square molded articles.

In the following tables, characteristic properties of a thermoplastic (polyethylene) filled with metal powder are illustrated.

Table 1 gives a survey of the thermal conductivity and ball indentation hardness of polyethylene in relation to the type of metal and the metal content.

TABLE 1

| Metal | Wt. % | Vol. % | Thermal conductivity W/k.m DIN 52 612 | Ball Indentation Hardness N/mm² DIN 53 456 |
| --- | --- | --- | --- | --- |
| Copper | 50 | 16 | 0.5 | 42.0 |
| Copper | 70 | 25 | 0.879 | 44.5 |
| Aluminum | 50 | 28 | 1.65 | 56.0 |
| Brass | 30 | 5 | 0.4 | 40.5 |

TABLE 1-continued

| Metal | Wt. % | Vol. % | Thermal conductivity W/k.m DIN 52 612 | Ball Indentation Hardness N/mm² DIN 53 456 |
|---|---|---|---|---|
| Tin Bronze | 30 | 5 | 0.4 | 41.0 |

The particle size of the metals employed lies between 80 and 300μ.

Table 2 illustrates data on the physical properties of a polyethylene with a molecular weight over 1,000,000 and a 50 Wt.% aluminum content (corresponding to 28 Vol.% aluminum) in comparison with unfilled GUR. (GUR means a polyethylene with a viscosimetrically determined molecular weight of 1,000,000 to 8,000,000).

TABLE 2

|  | GUR | GUR with 50% Aluminum |
|---|---|---|
| Density g/cm² (DIN 53 479) | 0.94 | 1.36 |
| Ball Indentation Hardness N/mm² (DIN 53 456) | 39 | 56 |
| Notched Impact Strength mg/mm² (DIN 53 453, 15° pointed notch) | 160 | 43 |
| Ultimate Tensile Strength 23° C. N/mm² (DIN 53 455) | 44 | 17 |
| Ultimate Tensile Strength (internal) 120° C. N/mm² | 27 | 7 |
| Thermal Conductivity W/K.m | 0.42 | 1.65 |

The manufacture of thermoplastics containing metal powder is well known. It is carried out, for example via the mixing of polymers and metal powder and the subsequent processing of the mixture in moldings or extruders to blocks or sheets.

The lining is cut according to the required measurements using this semi-finished product. The dimensions of the lining depend on the application and have to be individually shaped.

The driving or striking cap lining is usually inserted loosely in the cap. If necessary it can be replaced without difficulty.

What is claimed is:

1. A pile-driver comprising a cylinder and a piston, said piston being in registry with a cap disposed over an article to be driven, said cap having a lining in striking relationship with said piston, said lining comprising polyethylene having a viscosimetrically determined molecular weight of 1,000,000 to 10,000,000 and 5 to 40 volume percent of a metal powder.

2. A pile driver according to claim 1, wherein said thermoplastic is a polyamide.

3. A pile driver according to claim 1, wherein said metal powder is copper, brass or tin bronze.

4. A pile driver according to claim 1, wherein said metal powder is aluminum powder.

5. A pile driver according to claim 1, wherein said metal powder has an average size of less than 100μ.

* * * * *

UNITED STATES PATENT AND TRADEMARK OFFICE
CERTIFICATE OF CORRECTION

PATENT NO. : 4,345,656
DATED : August 24, 1982
INVENTOR(S) : Josef Berzen et al

It is certified that error appears in the above—identified patent and that said Letters Patent is hereby corrected as shown below:

On the title page,

Under "References Cited", before "Saunders" Delete "3,491,055" and insert -- 3,491,056 --

Signed and Sealed this

Thirtieth Day of November 1982

[SEAL]

Attest:

GERALD J. MOSSINGHOFF

Attesting Officer  Commissioner of Patents and Trademarks